United States Patent
Kawai et al.

(10) Patent No.: US 8,157,041 B2
(45) Date of Patent: Apr. 17, 2012

(54) INTAKE DEVICE FOR MOTORCYCLE

(75) Inventors: Daisuke Kawai, Hamamatsu (JP);
Kazuhisa Fujita, Hamamatsu (JP)

(73) Assignee: Suzuki Kabushiki Kaisha,
Hamamatsu-shi, Shizuoka (JP)

( * ) Notice: Subject to any disclaimer, the term of this patent is extended or adjusted under 35 U.S.C. 154(b) by 858 days.

(21) Appl. No.: 12/051,432

(22) Filed: Mar. 19, 2008

(65) Prior Publication Data
US 2008/0230030 A1    Sep. 25, 2008

(30) Foreign Application Priority Data

Mar. 22, 2007  (JP) .................. 2007-075174
Mar. 22, 2007  (JP) .................. 2007-075175

(51) Int. Cl.
*B60K 13/02*    (2006.01)

(52) U.S. Cl. ............................ 180/68.3; 180/68.1

(58) Field of Classification Search .......... 180/218, 180/219, 225, 227, 68.3, 68.1
See application file for complete search history.

(56) References Cited

U.S. PATENT DOCUMENTS 6,325,169 B1 * 12/2001 Tateshima et al. ............ 180/219
6,910,546 B2 *  6/2005 Tsutsumi et al. ............. 180/219

FOREIGN PATENT DOCUMENTS

| JP | 2007-075174 | 10/1923 |
|----|-------------|---------|
| JP | 2007-075175 | 10/1923 |
| JP | 04-094434 A | 3/1992 |
| JP | 4-123990 | 4/1992 |
| JP | 05-085454 A | 4/1993 |
| JP | 7-151029 | 6/1995 |
| JP | 2002-362464 | 12/2002 |
| JP | 2005-90267 | 4/2005 |
| JP | 2006-152963 | 6/2006 |
| JP | 2006-188952 | 7/2006 |
| JP | 2006-193026 | 7/2006 |
| JP | 2007-203858 | 8/2007 |

* cited by examiner

*Primary Examiner* — Katy M Ebner
(74) *Attorney, Agent, or Firm* — Barnes & Thornburg LLP (57) ABSTRACT

A motorcycle includes an engine having a substantially vertical cylinder assembly and disposed in a front half of a vehicle body frame, an inverted type rear cushion unit disposed behind the engine in substantially vertical posture, an air cleaner disposed behind the rear cushion unit and below a rider's seat, and an intake air passage connecting air an intake port formed in a rear portion of the cylinder assembly and the air cleaner each other. The intake air passage, i.e., connecting pipe, is arranged so as to be overlapped with an upper portion of the rear cushion unit in a side view of the motorcycle. A cross section shape of the connecting pipe is a vertically long shape in which its longitudinal size is greater than its lateral size.

10 Claims, 6 Drawing Sheets

INTAKE DEVICE FOR MOTORCYCLE

CROSS-REFERENCE TO RELATED APPLICATIONS

This application is a U.S. Application based upon and claiming the benefit of priority to Japanese Patent Application No. 2007-075174, filed on Mar. 22, 2007, and Japanese Patent Application No. 2007-075175, filed on Mar. 22, 2007, the contents of both of which are incorporated herein by reference.

BACKGROUND OF THE INVENTION

1. Field of the Invention

The present invention relates to an intake device for a motorcycle, particularly of straddle-type, in which an engine and an air cleaner disposed behind the engine are connected to each other through an intake air passage, a rear cushion unit is disposed between the engine and the air cleaner, and an intake temperature sensor for sensing intake air temperature is specifically provided.

2. Related Art

In a general straddle type motorcycle, for example, as disclosed in Japanese Patent Application Laid-open Publication Nos. 5-085454 and 2006-193026 (Patent Publications 1 and 2), a layout in which an engine is disposed in a front half of a vehicle body frame, a fuel tank is disposed above the engine, and a rider's seat is disposed behind the fuel tank, an air cleaner is disposed below the rider's seat, a rear cushion unit which suspends a rear wheel in a cushioning manner is disposed between the engine and the air cleaner at substantially vertical posture is employed.

The engine is disposed in such a posture that a cylinder assembly stands substantially vertical or forwardly inclining attitude on an upper surface of a crankcase, and an intake port opened at a back surface of the cylinder assembly and the air cleaner are connected to each other through an intake air passage. It is preferable to make the intake air passage is as short and straight as possible to reduce the intake air resistance of the engine and to make greater the passage cross sectional area.

However, since the rear cushion unit is disposed between the engine and the air cleaner, the intake air passage can not easily be formed straightly because the rear cushion unit becomes an obstruction. Therefore, the intake air passage has to be formed straight by disposing the intake air passage above the upper mounting portion of the rear cushion unit as in the motorcycles of the Patent Publications 1 and 2.

To achieve the above structure, it is necessary to lower the position of the upper end of the rear cushion unit or to raise the position of the air cleaner. According to the former idea, the entire length of the rear cushion unit should be shortened and the suspension stroke of the rear wheel should be reduced, thus being disadvantageous.

On the other hand, according to the latter idea, the rider's seat should be brought up and the riding comfort will be deteriorated. If the position of the lower end is lowered to increase the entire length of the rear cushion unit, the minimum road clearance is lowered and the off-road running performance is deteriorated, thus being inconvenient.

Furthermore, in recent years, many engines have fuel injection devices as means for supplying air-fuel mixture to the engines. It is necessary for the fuel injection device to sense throttle opening, engine speed, engine temperature, outside air temperature, atmospheric pressure, intake air temperature and the like using a sensor, to process such information by a computer, to obtain a correction value and to inject the most appropriate and necessary amount of fuel directly to an intake air passage of the engine by a fuel injector.

The fuel injection device has merits that the combustion efficiency is excellent, output can be enhanced, and since only a necessary and minimum amount of fuel is injected, fuel consumption amount is small.

Among the sensors, the intake air temperature sensor which senses the intake air temperature detects a temperature of air passing through the intake air passage and introduced into a combustion chamber of the engine. The intake air temperature sensor is subjected to various restraints when the intake air temperature sensor is disposed in each member constituting the intake air passage.

Generally, the intake air temperature sensor is mounted on an air cleaner box body as disclosed, for example, in Japanese Patent Application Laid-open Publication No. 4-94434 (Patent Publication 3), or mounted inside the air cleaner box as disclosed, for example, Japanese Patent Application Laid-open Publication No. 2006-188952 (Patent Publication 4).

When the intake air temperature sensor is mounted on the air cleaner box body, since the intake air does not flow uniformly in the box and the air cleaner box body has a box-like shape, a temperature of only a small portion of air can be detected, which is not preferable in terms of precision.

When the intake air temperature sensor is mounted inside the air clear box, there is an adverse possibility that a temperature of remaining air in the box is detected, which is also not preferable in terms of precision.

In the case of an off-road motorcycle, an exhaust system is disposed near the air cleaner box body in some cases. If the intake air temperature sensor is mounted on the air cleaner box body, heat generated by the exhaust system exerts an adverse influence on the intake air temperature sensor.

SUMMARY OF THE INVENTION

The present invention was conceived in consideration of the circumstances mentioned above and an object of the present invention is to provide an intake device for a motorcycle provided with a compact structure of an intake air passage capable of reducing intake air resistance by increasing an area of the passage, increasing the suspension stroke and the minimum road clearance and enhancing an off-road running performance is enhanced.

Another object of the present invention is to provide an intake device for a motorcycle capable of homogeneously detecting temperature of the entire intake air introduced into a combustion chamber of an engine.

These and other objects of the present invention can be achieved by providing, in one aspect, an intake device for a motorcycle, wherein an engine is mounted in a front half portion of a vehicle body frame and is provided with a cylinder assembly standing substantially vertically, a rear cushion unit is arranged behind the engine in substantially vertical posture, an air cleaner is arranged in a rear portion of the rear cushion unit and below a rider's seat, and an air intake port opened to a rear portion of the cylinder assembly and the air cleaner are connected to each other through an intake air passage, in which the intake air passage is arranged so as to be overlapped with an upper portion of the rear cushion unit in a side view of the motorcycle.

In this aspect, the following preferred embodiments may be provided.

The rear cushion unit may have an inverted attitude in which a damper chamber is provided at an upper portion thereof and a piston rod extends in an axial direction of the damper chamber from a lower end of the damper chamber, and the intake air passage is overlapped with the damper chamber located above an upper end of a coil spring wound around the damper chamber and a piston rod in a side view of the motorcycle.

The rear cushion unit may be mounted at an upper end thereof on the vehicle body frame at a position higher than an upper end of the cylinder assembly.

The intake air passage may be disposed so as to extend posterosuperiorly with respect to a plane orthogonal to an axis of the cylinder assembly in a side view of the motorcycle.

The intake air passage may include an intake pipe, a throttle body and a connecting pipe connected in the described order from a side portion of the engine to a side portion of the air cleaner, a portion of the connecting pipe is overlapped with an upper portion of the rear cushion unit in a side view of the motorcycle.

It may be further desired that a cross sectional shape of the overlapped portion of the connecting pipe is a longitudinally long shape having a longitudinal dimension is greater than a lateral dimension thereof.

In another aspect of the present invention, there is also provided an intake device for a motorcycle, wherein a combustion chamber of an engine and an air cleaner box are connected to each other through an intake air passage, and an intake air temperature sensor adapted to detect a temperature of intake air is disposed to the intake air passage.

This aspect may include the following preferred embodiments.

The intake air passage may include a connecting pipe, a throttle body and an intake pipe in the described order from the air cleaner box toward the combustion chamber, and the intake air temperature sensor is disposed to the connecting pipe.

The connecting pipe may be formed with a swelling portion, and the intake air temperature sensor is disposed on a wall surface of the swelling portion. It may be desired that a rear cushion unit is disposed at a position overlapping the connecting pipe in a side view, and the intake air temperature sensor is disposed substantially along the rear cushion unit.

The intake air temperature sensor may be disposed at a portion in a vicinity of a lowermost end of a rider's seat inside of the lowermost end in a vehicle width direction.

According to the intake device for the motorcycle of the present invention, the intake air passage which connects the engine and the air cleaner to each other and the upper portion of the rear cushion unit are overlapped with each other in a side view of the motorcycle, so that the intake air passage can be made straight and shortened, and the passage area of the intake air passage can be increased. The rear cushion unit is an inverted type so that the diameter of the upper portion of he rear cushion unit can be reduced, and the above effect can be enhanced.

The upper end of the rear cushion unit is mounted on the vehicle body frame at a position higher than the upper portion of the cylinder assembly. Therefore, the suspension stroke is increased, the minimum road clearance is increased and the off-road running performance is enhanced.

Further, the intake air passage is inclined posterosuperiorly with respect to a plane orthogonal to an axis of the cylinder assembly in a side view of the motorcycle. Accordingly, the radius of curvature of the intake port in the cylinder assembly can be increased, the intake air passage can further be straightened, and the intake air resistance can be reduced.

Since the portion of the connecting pipe having relatively high design flexibility among members constituting the intake air passage overlaps the upper portion of the rear cushion unit, it is possible to increase the cross section area of the connecting pipe and to increase the area of the passage as the intake air passage.

Furthermore, according to the intake device for the present invention, it is possible to homogeneously detect temperature of the entire intake air introduced into a combustion chamber of an engine. Further, it is possible to suppress disturbance of intake air flow, and to suppress adhesion of moisture to a sensor detector.

It is also possible to prevent the intake air temperature sensor and a rear cushion unit from interfering with each other when a rear suspension strokes. The intake air temperature sensor can be protected and disposed along a height direction. The intake air temperature sensor can be easily maintained.

Further, the strength and a mounting space of an intake air temperature sensor mounting portion can be sufficiently secured.

The nature and further characteristic features of the present invention will be made clearer from the following descriptions made with reference to the accompanying drawings.

DESCRIPTION OF THE PREFERRED EMBODIMENT

Hereunder, embodiments of the present invention will be described with reference to the accompanying drawings. Further, it is to be noted that terms "upper", "lower", "right", "left" and the like terms are used herein with reference to the illustrations of the drawings or in a standing attitude of a motorcycle.

With reference to FIGS. 1 to 4, a vehicle body frame 2 of a motorcycle 1 includes a head pipe 3, main pipes 4, a front pipe 5, down pipes 6, center frame members 7, a reinforcing pipe 8, seat pipes 9 and seat stays 10. The members 4, 6, 7, 9 and 10 are provided in right and left pairs (laterally symmetrically arranged), respectively. The reinforcing pipe 8 has an arc-shape, both ends thereof are connected to the right and left main pipes 4, respectively, and is connected to the front pipe 5 at the arc-shaped bottom.

A bridge pipe, not shown, is provided between upper ends of the right and left center frame members 7 in the vehicle width direction, and a later-described cushion upper end mounting bracket 35 is formed on a central portion of the bridge pipe.

An engine 12 is mounted to be a DOHC (double over head camshaft)-type four-stroke per-cycle engine having an intake camshaft and an exhaust camshaft, both not shown.

The engine 12 is mounted so as to be surrounded by the members 4 to 8 constituting a front half of the vehicle body frame 2 through a plurality of engine mount brackets, not shown.

The engine 12 includes a cylinder assembly 14 having a single cylinder substantially vertically disposed on an upper surface of a crankcase 13. An exhaust port 15 is opened on a front surface of the cylinder assembly 14, and an intake port 16 is also opened on a back surface of the cylinder assembly 14.

Figure 1:
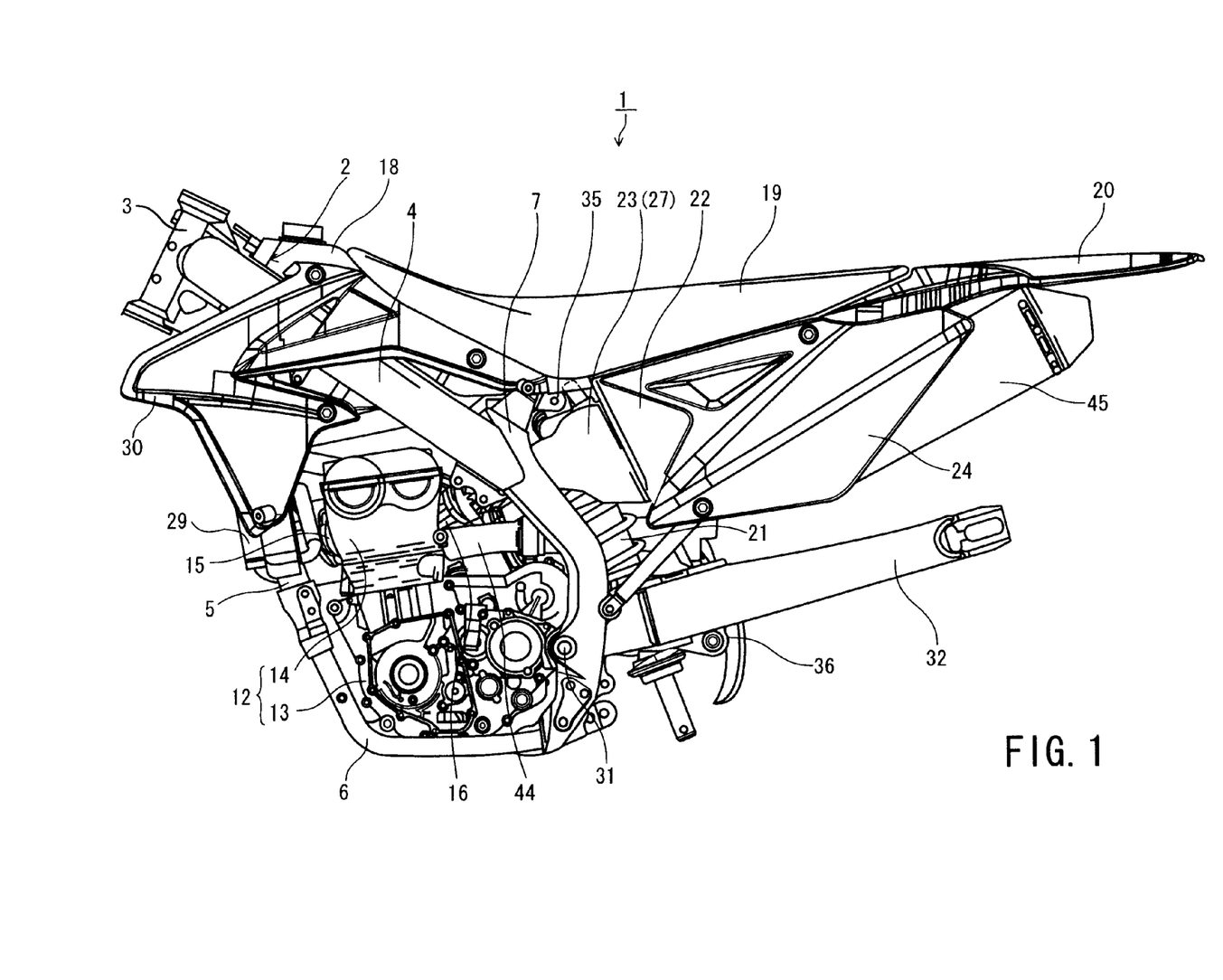
FIG. 1 is a left side view of a body portion of a motorcycle to which the present invention is applicable.
Figure 2:
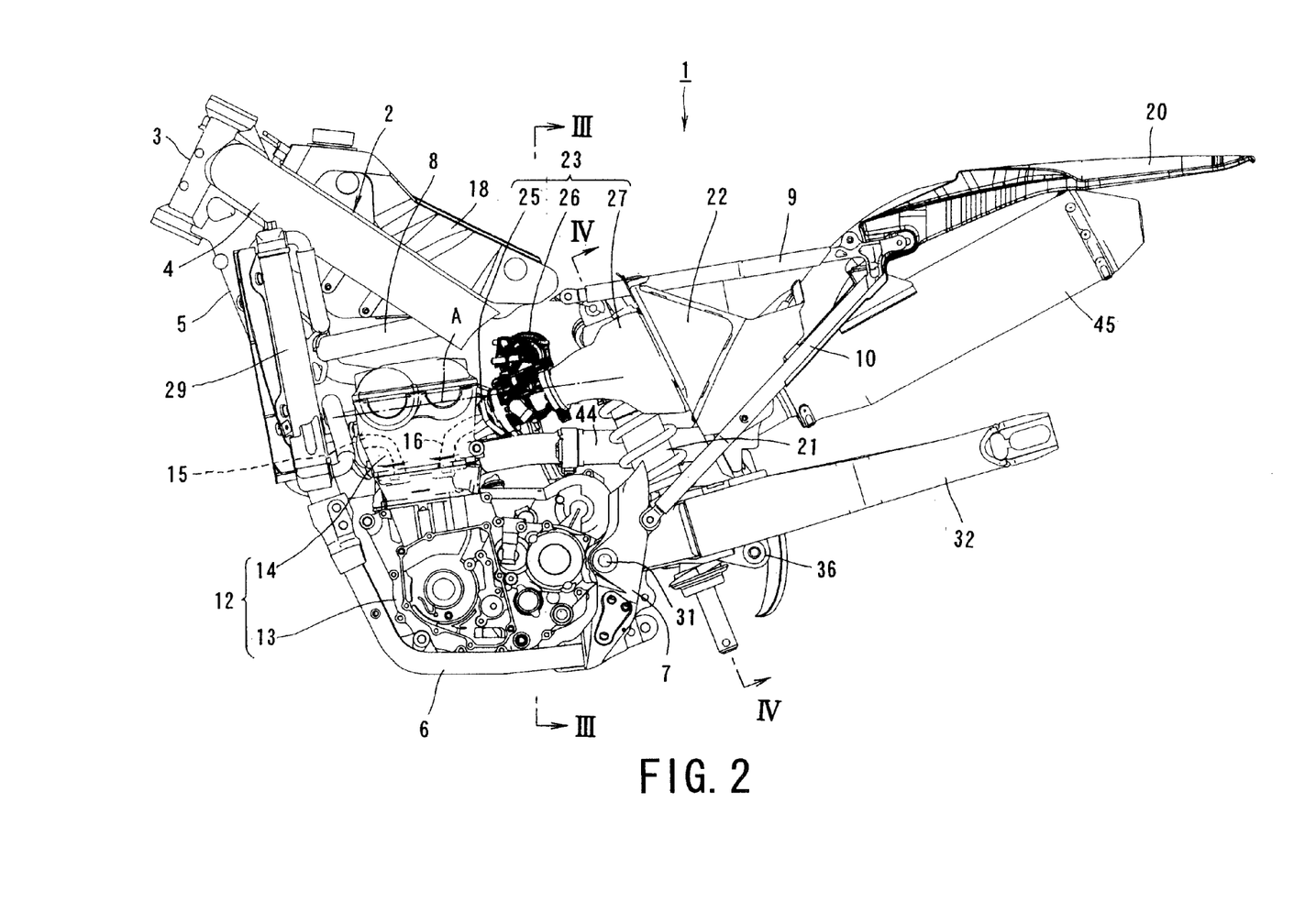
FIG. 2 is a left side view showing an essential portion of the motorcycle shown in FIG. 1.

A fuel tank 18 is disposed above the engine 12 between the right and left main pipes 4. A rider's seat 19 is disposed so as to extend from a rear upper surface of the fuel tank 18 to an upper portion of the seat pipe 9. A rear fender 20 is disposed so as to be adjacent to a rear portion of the rider's seat 19.

A rear cushion unit 21 is arranged behind the engine 12 so as to stand substantially vertically (or slightly incline forward). An air cleaner 22 is arranged behind the rear cushion unit 21 and below the rider's seat 19. The air cleaner 22 is surrounded by the center frame members 7, the seat pipes 9 and the seat stay 10 as viewed in a side view of the motorcycle.

The air cleaner 22 and the intake port 16 of the engine 12 (cylinder assembly 14) are connected to each other through an intake air passage 23 which is formed by connecting a plurality of members to each other. Both sides of the air cleaner 22 are covered with resin side covers 24.

The intake air passage 23 includes an intake pipe 25, a throttle body 26 and a connecting pipe 27 which are connected in this order from the side of the engine 12 to the side of the air cleaner 22. The intake air passage 23 is disposed so as to be inclined posterosuperiorly with respect to a plane A which is orthogonal to an axis of the cylinder assembly 14 as viewed in the side view of the motorcycle (see FIG. 2).

Radiators 29 for cooling the engine 12 are arranged on both right and left sides of the front pipe 5 of the vehicle body frame 2, and both right and left sides thereof are covered with resin radiator covers 30.

A front fork which supports a front wheel, not shown, a handle bar, a front fender and the like are pivotally supported by the head pipe 3 of the vehicle body frame 2. A pivot shaft 31 extending in the vehicle width direction is provided at lower portions of the center frame members 7. A front end of a swing arm 32 is pivotally supported by the pivot shaft 31. A rear wheel, not shown, is pivotally supported by a rear end of the swing arm 32, and power of the engine 12 is transmitted to the rear wheel through a chain, not shown. Generally, the chain is disposed along the swing arm 32 on the left side of the vehicle body.

An upper end of the rear cushion unit 21 is connected to the cushion upper end mounting bracket 35 (see FIG. 1) provided on the vehicle body frame 2 (bridge pipe) at a position higher than an upper end of the cylinder assembly 14. A lower end of the rear cushion unit 21 is connected to a cushion lower end mounting bracket 36 provided near a base end of the swing arm 32 through a plurality of link members, not shown.

Figure 3:
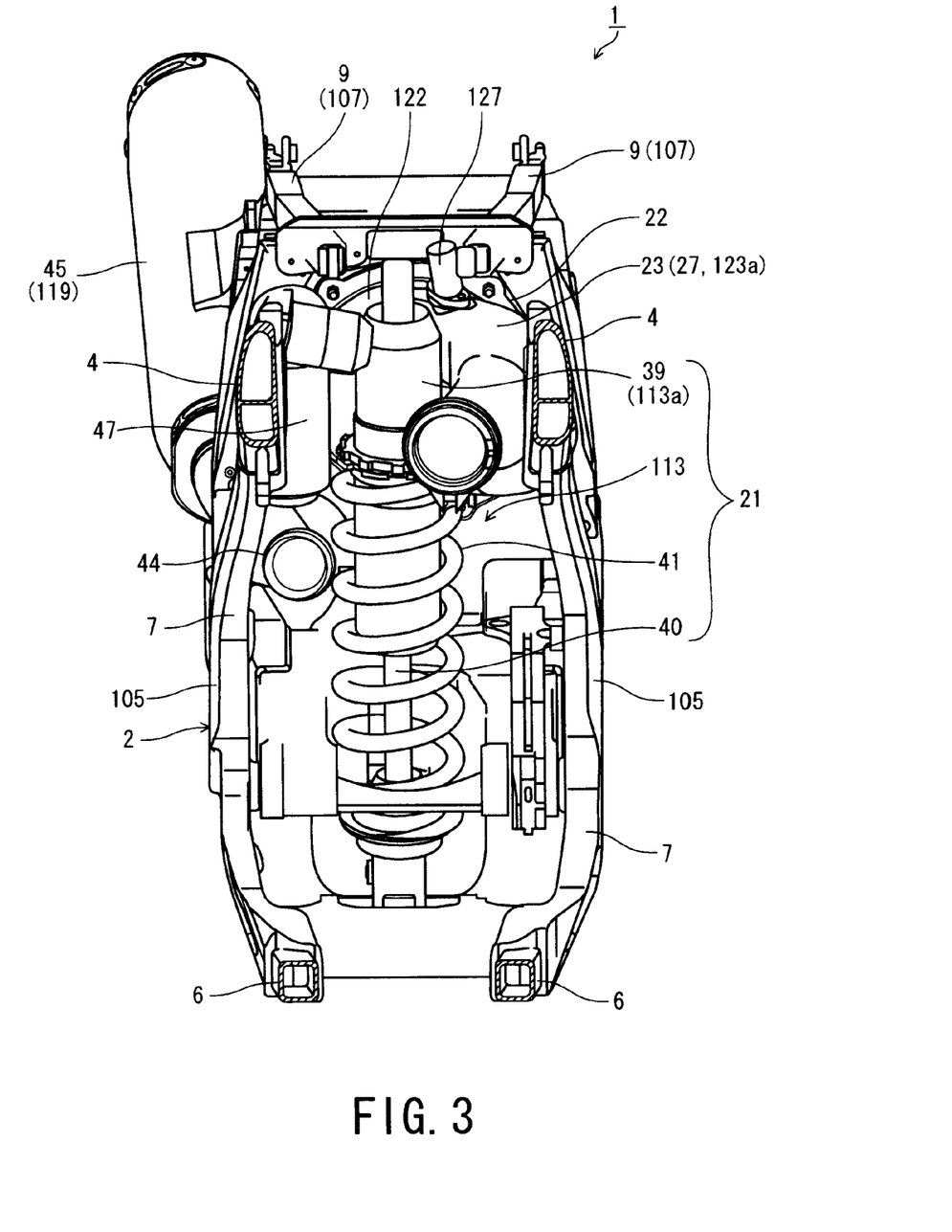
FIG. 3 is a vertical sectional view taken along the line III-III in FIG. 2 (FIG. 5) and shows an embodiment of the invention.
Figure 4:
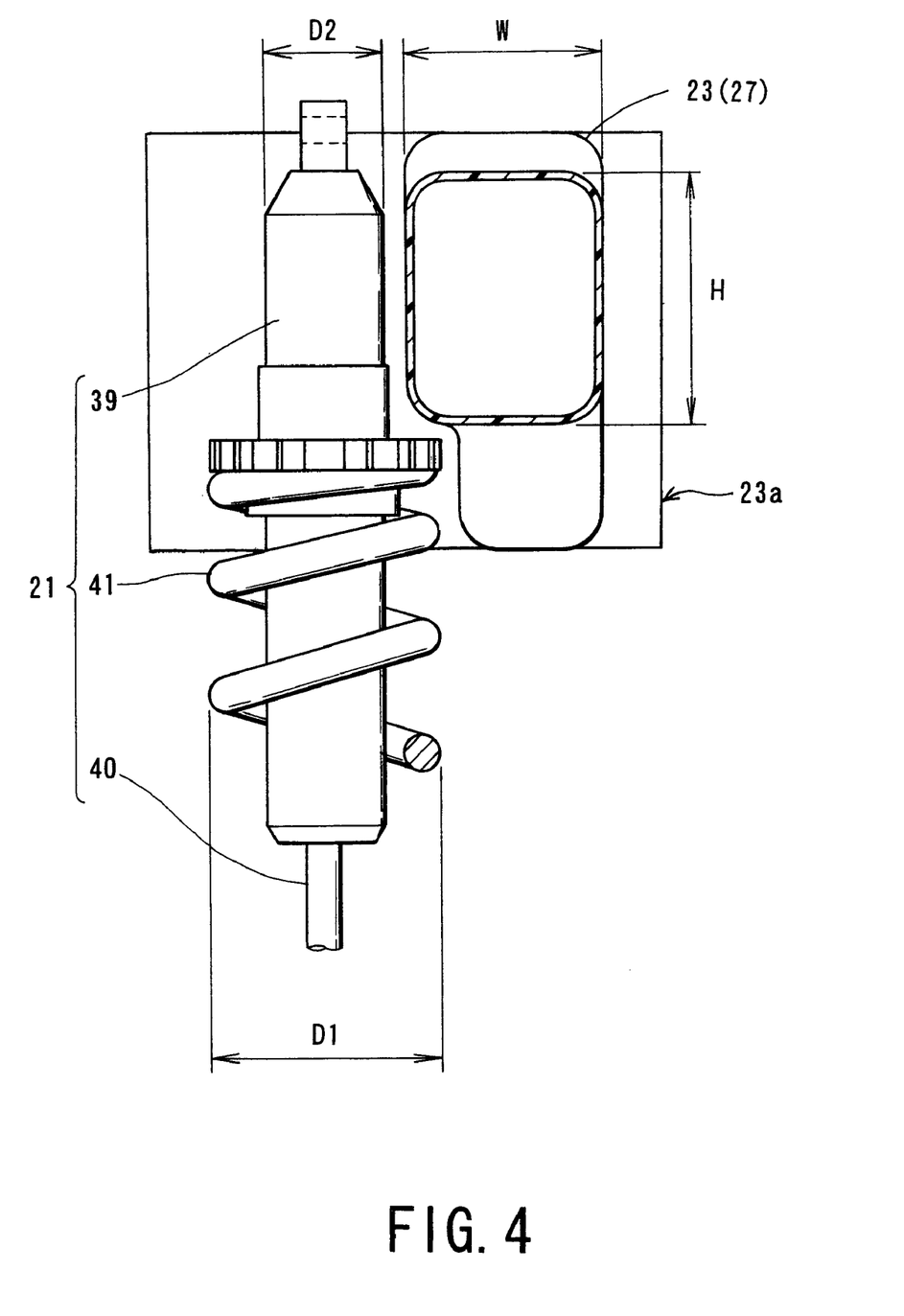
FIG. 4 is a vertical sectional view taken along the line IV-IV in FIG. 2.

The rear cushion unit 21 is an inverted type. As shown in FIGS. 3 and 4, a piston rod 40 expands and contracts in the axial direction of the rear cushion unit 21 from a lower end of a damper chamber 39 of a shock absorber which constitutes a main body of the rear cushion unit 21.

A coil spring 41 is wound around the damper chamber 39 and the piston rod 40. The height of the upper end of the coil spring 41 is located at an intermediate portion of the damper chamber 39. Therefore, an outer diameter D2 of the damper chamber 39 projecting upward from an upper end of the coil spring 41 is smaller than an outer diameter D1 of the coil spring 41.

Among the members 25, 26 and 27 constituting the intake air passage 23, a portion of the connecting pipe 27 is positioned so as to overlap a portion (a portion of the outer diameter D2) having a small diameter at which an upper portion of the damper chamber 39 projects from an upper portion of the rear cushion unit 21, i.e., an upper end of the coil spring 41 as viewed from side of the motorcycle, and the upper portion of the rear cushion unit 21 and the connecting pipe 27 are closely adjacently arranged in the vehicle width direction.

The rear cushion unit 21 is disposed near the central portion in the vehicle width direction, and the connecting pipe 27 is disposed on the left side of the upper portion of the damper chamber 39 of the rear cushion unit 21, for example.

As shown in FIG. 4, the cross section of a portion of the connecting pipe 27 adjacent to the upper portion of the rear cushion unit 21 in the vehicle width direction has such a vertically long shape as that its longitudinal size H is longer than its lateral size W.

The connecting pipe 27 has a swelling portion 23a which swells in the vehicle width direction. The swelling portion 23a is provided near a connecting portion between the connecting pipe 27 and the air cleaner 22.

The air intake characteristics can be changed by changing the capacity of the swelling portion 23a. The swelling portion 23a has the same height size as that of the air cleaner 22, and thus, a step of flowing of air in the air cleaner 22 into the connecting pipe 27 is reduced, and remaining of air in the air cleaner 22 is suppressed.

An exhaust pipe 44 is connected to the exhaust port 15 of the engine 12, and the exhaust pipe 44 is connected to an exhaust muffler 45 disposed at a rear portion of the vehicle body. As described above, the chain which transmits the power of the engine 12 to the rear wheel is disposed on the left side of the vehicle body and vertically swings with the swing arm 32 and the rear wheel. Therefore, the exhaust pipe 44 and the exhaust muffler 45 are mounted on the right side of the vehicle body to prevent them from interfering with the chain.

As shown in FIG. 3, a reservoir tank 47 of the rear cushion unit 21 is disposed on a side opposite from the connecting pipe 27 of the intake air passage 23 with respect to the upper portion of the rear cushion unit 21, i.e., on the right side such that the space is effectively utilized.

The exhaust pipe 44 is disposed below the reservoir tank 47. It is necessary for the exhaust pipe 44 to be disposed at a location as low as possible so that the exhaust pipe 44 does not interfere with a leg of a rider sitting on the rider's seat 19. The exhaust pipe 44 is accommodated between the right center frame member 7 and the rear cushion unit 21 so that the exhaust pipe 44 does not project in the vehicle width direction. The exhaust pipe 44 (exhaust muffler 45) and the intake air passage 23 (air cleaner 22) are disposed respectively right and left sides. Accordingly, it is possible to prevent exhaust heat from being transmitted to the intake air passage 23 or air cleaner 22.

As described above, according to the motorcycle 1 of the present invention, the intake air passage 23 of the air cleaner 22 is disposed in the vehicle width direction just beside a portion where the rear cushion unit 21 has the smallest outer diameter from which the damper chamber 39 projects upward from the upper end of the coil spring 41. Therefore, it is possible to prevent the intake air passage 23 from swelling outward in the vehicle width direction, to straighten the intake air passage 23 as much as possible and to effectively reduce the intake air resistance.

Among the members constituting the intake air passage 23, a portion of the connecting pipe 27 having relatively high design flexibility is arranged in the vehicle width direction beside the upper portion of the rear cushion unit 21, and the longitudinal size H of the cross section shape of the connecting pipe 27 formed to have the longitudinally long shape greater than the lateral size W. Thus, the passage area of the intake air passage 23 is increased and the intake air resistance can be greatly reduced.

Since the cross sectional shape of the connecting pipe 27 is gradually varied from a rectangular shape to a circular shape from the upstream side of the intake air to the downstream side of the intake air, it is possible to suppress abrupt variation in the cross sectional shape of the intake air passage 23, and the intake air resistance can further be reduced.

The intake air passage 23 is arranged so as to be posterosuperiorly inclined with respect to the plane A orthogonal to the axis of the cylinder assembly 14 as viewed from side of the motorcycle. Therefore, the intake air passage 23 can be formed coaxially as close as possible with respect to the intake port 16 which is generally formed anteroinferior toward the combustion chamber, and the intake air passage 23 can be straightened over the entire length including the intake port 16 as well.

The intake air resistance can largely be reduced in this respect as well. The intake air passage 23 is posterosuperiorly inclined largely with respect to the plane A. Accordingly, the radius of curvature of the intake port 16 can be increased, the intake air resistance in the intake port 16 can also be reduced, and the intake air efficiency can further be enhanced.

The upper end of the rear cushion unit 21 is mounted on the vehicle body frame 2 (cushion upper end mounting bracket 35) at the position higher than the upper end of the cylinder assembly 14. Therefore, it is possible to increase a suspension stroke and the minimum height from the ground and to enhance the off-road running performance of the motorcycle 1.

The exhaust pipe 44 is arranged in the vehicle width direction beside the coil spring 41 of the rear cushion unit 21 at a height where the exhaust pipe 44 overlaps the coil spring 41 of the rear cushion unit 21 as viewed from side of the motorcycle. However, since the diameter of the exhaust pipe 44 is smaller than that of the intake air passage 23 (connecting pipe 27), even if the exhaust pipe 44 is disposed just beside the coil spring 41, the projecting amount of the exhaust pipe 44 toward the vehicle body is small, and the exhaust pipe 44 can sufficiently be disposed inside the center frame members 7.

Figure 5:
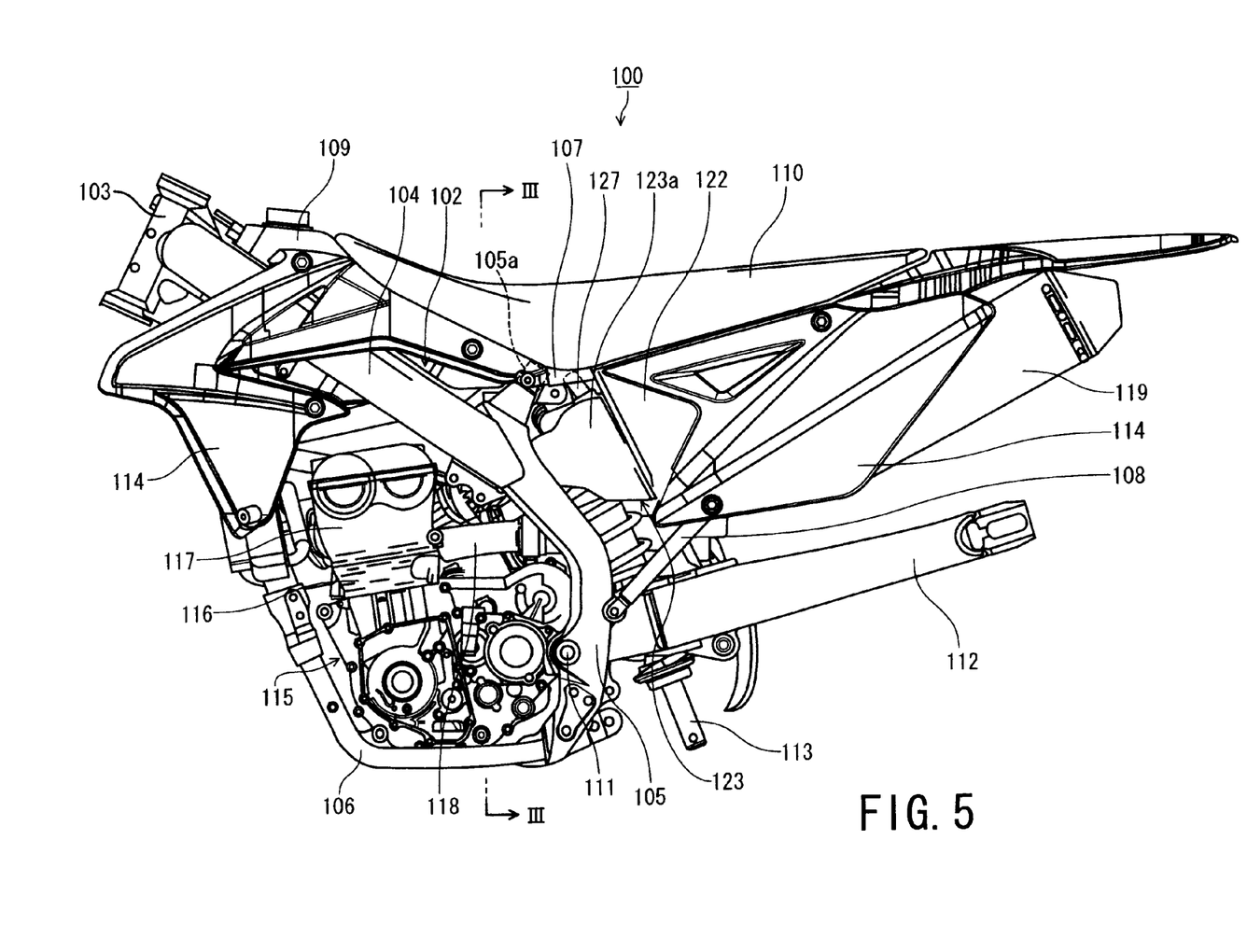
FIG. 5 is a left side view, similar to FIG. 1, of a body portion of a motorcycle to which the present invention is applicable.
Figure 6:
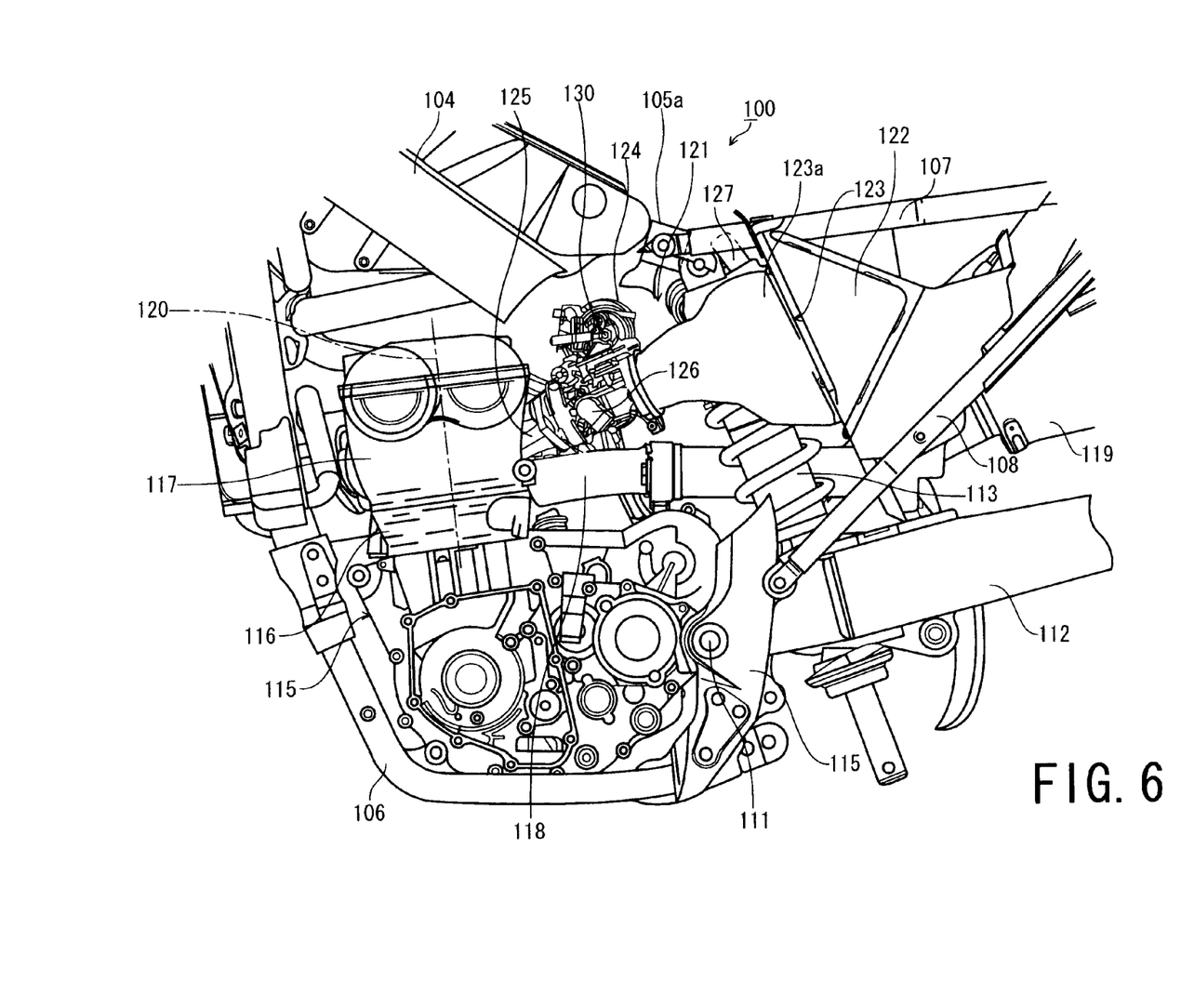
FIG. 6 is a left side view, similar to FIG. 2, showing an essential portion of the motorcycle shown in FIG. 5.

FIGS. 3, 5 and 6 are views representing another embodiment of the present invention, which will be described in detail hereunder.

FIGS. 5 and 6 are a left side views showing a vehicle body portion and essential portion of a motorcycle, which are similar to those shown in FIGS. 1 and 2, respectively.

With reference to FIGS. 5 and 6, as mentioned with reference to the former embodiment shown in FIGS. 1 to 3, a motorcycle 100 is of a straddle-type motorcycle, includes a vehicle body frame 102, and a head pipe 103 is provided in front of the vehicle body frame 102. The head pipe 103 is provided with a steering mechanism including a front fork which rotatably supports a front wheel and a handle bar.

The vehicle body frame 102 is of a twin tube type, for example.

The vehicle body frame 102 includes: a pair of right and left main frames 104 which laterally spread immediately after the head pipe 103 and then extending diagonally downward and rearward in parallel to each other; a pair of right and left body frames 105 which are integrally connected to rear ends of the main frames 104 and extending substantially upward and downward; a pair of right and left cradle frames 106 which extend substantially downward from a rear lower portion of the head pipe 103 and then bent rearward and connected to front sides of lower ends of the body frames 105; a pair of right and left seat rails 107 extending rearward and upward from rear sides of upper ends of the body frames 105; a pair of right and left support frames 108 extending diagonally rearward and upward toward rear ends of the seat rails 107 from rear sides of substantially central portions of the body frames 105; and a bridge frame 105a which is formed on upper ends of the body frames 105 and connecting the right and left body frames 105 with each other.

A fuel tank 109 is mounted between the right and left main frames 104, and a straddle-type rider's seat 110 is disposed from upper surfaces of rear portions of the main frames 104 to a position above the seat rails 107.

A pivot shaft 111 is provided at substantially central lower portions of the body frames 105. A swing arm 112 is elastically pivoted about the pivot shaft 111 by a rear cushion unit 113 and a link lever, not shown, such that the swing arm 112 is swingable about the pivot shaft 111.

A rear wheel, not shown, is rotatably pivoted to a rear end of the swing arm 112. A portion of a side surface of the vehicle body is covered by a vehicle body cover 114 constituting one part of an air cleaner box 122.

In FIG. 6, the vehicle body cover 114 is removed and portions of the main frames 104 and the body frames 105 are cut away.

With reference to FIGS. 5, 6 and 3, a four-stroke-cycle single-cylinder engine 115 is mounted in a space surrounded by a central lower portion of the vehicle body, the main frames 104, the body frames 105 and the cradle frames 106 through a plurality of engine suspending brackets. The engine 115 includes a cylinder 116 which substantially stands in the vertical direction, and an exhaust pipe 118 is connected to a front portion of a cylinder head 117 disposed on the cylinder 116.

The exhaust pipe 118 extends rearward through a right side of the engine 115. A downstream end of the exhaust pipe 118 is connected to a muffler 119 mounted diagonally rearward and upward on the one side of the vehicle body in the illustrated embodiment, on the right side lower portion of the rider's seat 110.

A rear portion of the cylinder head 117 is provided with an intake port, not shown, connected to a combustion chamber in the engine 115. A downstream end of the intake air passage 121 is connected to the intake port. The intake air passage 121 intersects with a plane orthogonal to a cylinder axis 120 and inclines rearward and upward. An upstream end of the intake air passage 121 is connected to the air cleaner box 122 disposed under the rider's seat 110. The air cleaner box 122 takes air from the above.

The intake air passage 121 includes a connecting pipe 123, a throttle body 124 and an intake pipe 125 in this order from the air cleaner box 122 toward the combustion chamber in the engine 115, and the intake pipe 125 is connected to an intake port. The throttle body 124 includes a fuel injector 130 constituting an electronic fuel injection device.

A reference numeral 126 denotes a throttle position sensor constituting the electronic fuel injection device.

The rear cushion unit 113 is disposed at a position which overlaps the connecting pipe 123 as viewed in a side view. The connecting pipe 123 is curved in a vehicle width direction so as to bypass a damper chamber 113a disposed in an upper portion of the rear cushion unit 113, and a swelling portion 123a is provided near a connecting portion with respect to the air cleaner box 122.

The swelling portion 123a is partially overlapped with the rear cushion unit 113 as viewed from side, and the overlapped portion has a vertically long passage-shaped cross section which is long in the vertical direction.

An intake air temperature sensor 127 constituting other electronic fuel injection device is mounted on a ceiling wall surface of the swelling portion 123a so that a detector, not shown, of the intake air temperature sensor 127 faces an interior of the swelling portion 123a.

The axis of the intake air temperature sensor 127 is disposed substantially along the axis of the rear cushion unit 113 near the lowermost end of the rider's seat 110 on the inner side from the lowermost end in the vehicle width direction. The intake air temperature sensor 127 is disposed behind the bridge frame 105a, and the intake air temperature sensor 127 is sandwiched between the bridge frame 105a and a front surface of the air cleaner box 122.

The pair of right and left seat rails 107 are located on both the sides of the intake air temperature sensor 127, respectively.

This embodiment will operates as follows.

The intake air temperature sensor 127 is disposed in a manner that the detector, not shown, of the intake air temperature sensor 127 faces the interior of the connecting pipe 123 constituting the intake air passage 121 instead of the air cleaner box 122 unlike the conventional technique. Accordingly, it is possible to uniformly detect the temperature of the entire intake air introduced into the combustion chamber of the engine 115.

In the case of the conventional box-shaped air cleaner box, the inside air remains in a specific space, for example, a corner portion. In the case of the intake air passage 121, air always flow and thus, there is no possibility that the temperature of the remaining air is erroneously detected, and the temperature of intake air introduced into the combustion chamber can be precisely detected.

The intake air temperature sensor 127 has a detecting element portion projecting into the intake air passage 121. Therefore, if the intake air temperature sensor 127 is disposed in the vicinity of or downstream side from a throttle valve provided in the throttle body 124, the intake air flow may be disturbed.

However, if the intake air temperature sensor 127 is mounted on the connecting pipe 23 located on the upstream side from the throttle body 124, the disturbance of the intake air flow may be suppressed. Especially, since the intake air temperature sensor 127 is disposed on the ceiling wall surface of the connecting pipe 123, even if moisture is included in intake air, it is possible to prevent the moisture from adhering to the detector.

The rear cushion unit 113 is disposed at the position overlapping the connecting pipe 123 as viewed in the side view, and the axis of the intake air temperature sensor 127 is disposed substantially along the axis of the rear cushion unit 113. Accordingly, it is possible to prevent the intake air temperature sensor 127 and the rear cushion unit 113 from interfering with each other at the time of performing the stroking motion of the rear suspension.

Furthermore, since the intake air temperature sensor 127 is disposed near the lowermost end of the rider's seat 110 at inner side from the lowermost end in the vehicle width direction, the side of the intake air temperature sensor 127 can be covered with the lowermost end of the rider's seat 110, and the intake air temperature sensor 127 can be protected against stepping stone, sand and mud from the side of the motorcycle.

Since the back surface of the rider's seat 110 is formed in the concaved shape, the height direction size can be secured if it is disposed inside from the lowermost end, and the intake air temperature sensor 127 can be disposed along the height direction. Thus, if the rider's seat 110 is removed, it is possible to access the intake air temperature sensor 127 from the upper side, and the maintenance workability can be enhanced.

The intake air temperature sensor 127 is disposed between the bridge frame 105a and the front surface of the air cleaner box 122, and the intake air temperature sensor 127 is disposed at the position partially overlapping the seat rails 107 in a side view. Therefore, it is possible to protect the intake air temperature sensor 127 from all directions.

Furthermore, since the connecting pipe 123 is formed with the swelling portion 123a, the intake air characteristics suitable for a model can be obtained. The swelling portion 123a swelling in the vehicle width direction is formed over the entire height region of the connecting pipe 123 in the vicinity of the connecting portion with respect to the air cleaner box 122.

Since the mounting rigidity of the connecting pipe 123 on the air cleaner box 122 is increased, the strength of the mounting portion of the intake air temperature sensor 127 can be secured.

In addition, since the detector of the intake air temperature sensor 127 is disposed in the swelling portion 123a, the size of the intake air temperature sensor 127 projecting into the intake air passage 121 can be reduced, and the disturbance of the intake air can be thus suppressed. Since the clearance is provided, the connecting pipe 123 can be set long, and a sufficient mounting space for the intake air temperature sensor 127 can be secured.

If the air cleaner box 122 has such a structure that air is sucked from above, the mainstream of air flowing through the connecting pipe 123 is formed on the upper portion of the connecting pipe 123. Therefore, it is possible to detect the intake air temperature more precisely.

The intake air passage 121 intersects with the plane orthogonal to the cylinder axis 120 and inclines rearward and upward. Accordingly, the air can flow straightly into the intake port, the intake air efficiency is enhanced, and the engine power can be increased.

The swelling portion 123a is partially that overlapped with the rear cushion unit 113 as viewed from side so as to have the passage-shaped cross section which is long in the vertical direction. Accordingly, the projecting amount of the intake air passage 121 in the vehicle width direction can be suppressed while maintaining the passage area. Since the height size of the upstream end of the connecting pipe 123 is substantially equal to the height size of a portion near the exit of the air cleaner box 122, intake air flow is less prone to be disturbed.

In addition, from a portion near the exit of the air cleaner box 22 toward the downstream side, the connecting pipe 123 is formed into a smooth circular cross section shape. Therefore, the intake air resistance can be reduced.

Since the upstream end of the connecting pipe 123 is close to the box-shaped air cleaner box 122 having high rigidity, it is possible to enhance the mounting strength of the intake air temperature sensor 127.

It is further to be noted that the present invention is not limited to the described embodiments and many other changes and modifications may be made without departing from the scopes of the appended claims.

What is claimed is:

1. An intake device for a motorcycle,
   wherein a four-stroke engine equipped with an electronic fuel injection system is mounted in a front half portion of a vehicle body frame and is provided with a cylinder assembly standing substantially vertically, a rear cushion unit including a damper chamber, a piston rod and a coil spring is arranged behind the engine in a substantially vertical posture, an air cleaner is arranged in a rear portion of the rear cushion unit and below a rider's seat, an air intake port opened to a rear portion of a cylinder head of the cylinder assembly and the air cleaner are connected to each other through an air intake passage, in which the air intake passage includes an intake pipe, a throttle body and a connecting pipe connected in the described order as viewed from a side portion of the engine to a side portion of the air cleaner, an overlapping portion of the connecting pipe which is overlapped with an upper portion of the rear cushion unit extends above an upper end of the coil spring in a side view of the motorcycle, an axis of a downstream end opening of the connecting pipe extends above a center of an upstream end opening of the connecting pipe, the connecting pipe is provided with both an upper enlarged portion that extends upward from a main portion of the air intake passage and a lower enlarged portion that extends from the main portion of the air intake passage, as viewed from a side view, at least a part of the lower enlarged portion overlaps an upper portion of the coil spring, and the lower enlarged portion extends in a vehicle width direction to a smaller extent than the main portion of the air intake passage and the upper enlarged portion.

2. The intake device for the motorcycle according to claim 1, wherein the rear cushion unit has an inverted attitude in which a damper chamber is provided at an upper portion thereof and a piston rod extends in an axial direction of the damper chamber from a lower end of the damper chamber.

3. The intake device for the motorcycle according to claim 1, wherein an upper end of the rear cushion unit is mounted on the vehicle body frame at a position higher than an upper end of the cylinder assembly.

4. The intake device for the motorcycle according to claim 1, wherein the air intake passage is disposed so as to extend posterosuperiorly with respect to a plane orthogonal to an axis of the cylinder assembly in a side view of the motorcycle.

5. The intake device for the motorcycle according to claim 1, wherein the connecting pipe is formed into a longitudinally long shape having a height of a lateral cross-section in the area that is overlapped by the upper portion of the rear unit which is greater than a lateral dimension thereof.

6. An intake device for a motorcycle, wherein a four-stroke engine equipped with an electronic fuel injection system is mounted in a front half portion of a vehicle body frame and is provided with a cylinder assembly standing substantially vertically, the device comprising:

a rear cushion unit arranged behind the engine in a substantially vertical posture, an air cleaner arranged in a rear portion of the rear cushion unit and below a rider's seat, an air intake port opened to a rear portion of a cylinder head of the cylinder assembly, wherein the air intake port and the air cleaner are connected to each other through an air intake passage which includes an intake pipe, a throttle body and a connecting pipe connected in the described order when viewed from a side portion of the engine to a side portion of the air cleaner, an enlarged portion of the connecting pipe being provided at an upstream end of the connecting pipe, an axis of a downstream end opening of the connecting pipe extending above a center of the enlarged portion, and an intake air temperature sensor adapted to detect a temperature surface of the enlarged portion, wherein, in a side view, the connecting pipe is provided above an exhaust pipe arranged above a crankcase of the engine, the axis of the downstream end opening of the connecting pipe is above an axis of an upstream end of the connecting pipe and, in a side view, the intake air temperature sensor is mounted to an upper wall section of the enlarged portion of the connecting pipe above the axis of the downstream end of the connecting pipe.

7. The intake device for the motorcycle according to claim 6, wherein a rear cushion unit is disposed at a position overlapped with the connecting pipe in a side view, and the intake air temperature sensor is disposed substantially along the rear cushion unit.

8. The intake device for the motorcycle according to claim 7, wherein the intake air temperature sensor is disposed at a position in a vicinity of a lowermost end of a rider's seat inside of the lowermost end in a vehicle width direction.

9. The intake device for the motorcycle according to claim 6, wherein the vehicle body comprises a head pipe, a pair of rim and left main frames, a pair of right and left body frames, a pair of right and left seat rails and a bridge frame formed on upper ends of the body frames, the air intake temperature sensor is disposed between the bridge frame and a front surface of the air cleaner and is overlapped with the seat rails in a side view of the motorcycle.

10. An intake device for a motorcycle, wherein a four-stroke engine equipped with an electronic fuel injection system is mounted in a front half portion of a vehicle body frame and is provided with a cylinder assembly standing substantially vertically, the device comprising:

a rear cushion unit arranged behind the engine in a substantially vertical posture, an air cleaner arranged in a rear portion of the rear cushion unit and below a rider's seat, an air intake port opened to a rear portion of a cylinder head of the cylinder assembly, wherein the air intake port and the air cleaner are connected to each other through an air intake passage that includes an intake pipe, a throttle body and a connecting pipe connected in the described order when viewed from a side portion of the engine to a side portion of the air cleaner, the connecting pipe including an enlarged portion at an upstream end of the connecting pipe, an axis of a downstream end opening of the connecting pipe extends above a center of the enlarged portion, and an intake air temperature sensor adapted to detect a temperature surface of the enlarged portion, wherein the enlarged portion includes both upper and lower enlarged portions which are formed in an expanded manner away from a main portion of the air intake passage such that the upper enlarged portion had a vertical height dimension smaller than that of the lower swelling portion but the lower enlarged portion extends in a vehicle width direction to a smaller extent than the upper enlarged portion.

* * * * *